(12) United States Patent
Da Silva Junior

(10) Patent No.: US 12,325,096 B2
(45) Date of Patent: Jun. 10, 2025

(54) ROTATING ARC WELDING TORCH

(71) Applicant: PETRÓLEO BRASILEIRO S.A.—PETROBRAS, Rio de Janeiro (BR)

(72) Inventor: Daniel Adolpho Da Silva Junior, Nova Iguaçu (BR)

(*) Notice: Subject to any disclaimer, the term of this patent is extended or adjusted under 35 U.S.C. 154(b) by 429 days.

(21) Appl. No.: 17/757,445

(22) PCT Filed: Dec. 15, 2020

(86) PCT No.: PCT/BR2020/050549
§ 371 (c)(1),
(2) Date: Jun. 15, 2022

(87) PCT Pub. No.: WO2021/119787
PCT Pub. Date: Jun. 24, 2021

(65) Prior Publication Data
US 2023/0018884 A1    Jan. 19, 2023

(30) Foreign Application Priority Data
Dec. 20, 2019  (BR) ............. 10 2019 027606-1

(51) Int. Cl.
*B23K 9/28* (2006.01)
*B23K 9/29* (2006.01)

(52) U.S. Cl.
CPC ............. *B23K 9/285* (2013.01); *B23K 9/295* (2013.01)

(58) Field of Classification Search
CPC ...... B23K 9/0216; B23K 9/173; B23K 9/285; B23K 9/295

(Continued)

(56) References Cited

U.S. PATENT DOCUMENTS

| | | | |
|---|---|---|---|
| 2,572,084 A | 10/1951 | Wilson | |
| 3,396,263 A | 8/1968 | Even et al. | |

(Continued)

FOREIGN PATENT DOCUMENTS

| | | |
|---|---|---|
| CN | 104384685 B | 12/2017 |
| WO | WO 2015/005906 A1 | 1/2015 |

OTHER PUBLICATIONS

International Search Report and Written Opinion dated Jan. 18, 2021, in International Application No. PCT/BR2020/050549.

*Primary Examiner* — Dana Ross
*Assistant Examiner* — James F Sims, III
(74) *Attorney, Agent, or Firm* — Knobbe, Martens, Olson & Bear, LLP

(57) ABSTRACT

The invention uses the principle of the pneumatic turbine and a cooling system for the entire welding torch, wherein the gas used in the welding process, or even compressed air, enters through a conductor in the axial direction to the consumable, thus moving, a turbine, which in turn moves a tip and a tip holder. The welding torch can be used for extended periods of time at 100% cycle on welding machines of NEMA class I, since it is water cooled. In addition, the torch can be used in any welding source from any manufacturer, whether the machine is new or very old, as the euro standard (socket) is the same. This implies that there is no need to purchase a new welding machine, but only a torch. In construction and assembly environments, such as riser welding, refineries, joint welding, coating, and processes that aim to build a part using only one welding consumable, the use of said torch would bring a significant balance in terms of reduction of time and cost. This torch can also be used in any existing welding device, within the abovementioned processes.

7 Claims, 3 Drawing Sheets

(58) Field of Classification Search
USPC .......................................................... 219/69.1
See application file for complete search history.

(56) References Cited

U.S. PATENT DOCUMENTS

| | | | |
|---|---|---|---|
| 7,084,373 | B2 | 8/2006 | Sugahara et al. |
| 8,674,534 | B2* | 3/2014 | Bodnar, Jr. ............... H02P 9/04 |
| | | | 290/43 |
| 9,403,233 | B2 | 8/2016 | Pagano et al. |
| 2015/0190878 | A1 | 7/2015 | Roen et al. |
| 2015/0308495 | A1* | 10/2015 | Fatania ................. F16C 33/585 |
| | | | 451/52 |
| 2018/0345402 | A1 | 12/2018 | Wall et al. |
| 2019/0111511 | A1* | 4/2019 | Maruyama ........... B23K 9/1336 |

\* cited by examiner

ROTATING ARC WELDING TORCH

FIELD OF THE INVENTION

The present invention presents a welding torch applicable to any welding source in the GMAW, FCAW and MCAW processes. The proposed welding torch can be used on any machine from any manufacturer, whether new or old. The interchangeability is due to the euro standard (socket) being the same for the sources, even if they are new or old.

DESCRIPTION OF THE STATE OF THE ART

Shielding gas metal arc welding, GMAW (Gas Metal Arc Welding), is a welding process between the part and the consumable in the form of a wire supplied by a continuous feeder, performing a union of metallic materials by heating and fusion. The electric arc continuously melts the wire as it is fed into the weld pool. The weld metal is shielded from the atmosphere by a flow of gas, or a mixture of gases, inert (MIG) or active (MAG).

In the FCAW (Flux Cored Arc Welding) process, the wire used in welding is tubular, and its interior is filled with a flux composed of non-metallic powders, which guarantees special characteristics to this process. The MCAW (Metal Cored Arc Welding) has in its interior a flux composed of metallic powders, thus providing high deposition efficiency.

There is an extreme difficulty in using the technique of electric arc welding in risers (rigid or flexible pipes normally used in the oil industry) with straight or composite chamfers applying conventional electric arc processes.

The risers correspond to suspended sections of the pipes that interconnect the subsea production lines. These pipes can also be used to conduct fluids from the surface of a platform to a subsea system, in which case they are called injection, export, or even drilling risers.

The risers are subjected to welding processes so that, in this way, the conductive sections are established. However, before welding, there are the machining and alignment steps; in particular, the machining, which will shape the chamfer, is an operation that consumes considerable time. In addition to the time for machining a chamfer, there is the consumption of filler metal. This consumption is optimized when you have a straight or composite chamfer.

The torch with rotating consumable, to be described in this invention, provides the reduction of the chamfer angle. Thus, a lower consumption of filler metal and a shorter welding time are obtained, resulting in a reduction in the total manufacturing time of the riser joint.

The devices presented in documents U.S. Pat. Nos. 2,572,084, 3,396,263 and US2015019081978 have limiting factors, whether it is excessive weight for manual use or limited use time. Documents US20180345402 and CN104384685B differ from the proposal of the invention, because they present movements of the electrode in a vibratory way or with the aid of an electric motor in its rotating movement.

All prior art documents mentioned above do not have the unique features of this invention, which will be presented in detail below.

BRIEF DESCRIPTION OF THE INVENTION

The present invention uses the principle of the pneumatic turbine and a cooling system for the entire welding torch, in which the gas used in the welding process, or even the compressed air, enters through a conductor in the axial direction to the consumable, moving, in this way, a turbine, which in turn moves the components called tip and tip holder.

The proposed welding torch can be used for extended periods of time with 100% cycle on NEMA class I welding machines; since it is water cooled, it can be used for welding in straight or nearly straight chamfers (composite), dispensing with machining or greatly reducing this operation; or even in additive manufacturing processes. In addition, the torch can be used in any power source from any manufacturer, whether the machine is new or very old, since the euro standard (socket) is the same. This implies that there is no need to purchase a new welding machine, but only a torch.

BRIEF DESCRIPTION OF DRAWINGS

The present invention will be described in more detail below, with reference to the attached figures which, in a schematic way and not limiting the inventive scope, represent examples of its embodiment. In the drawings, there are.

DETAILED DESCRIPTION OF THE INVENTION

The use of the rotating arc welding torch, proposed in the present invention, is capable of working both in a GMAW welding machine manufactured, for example, in 1970, and in a machine manufactured in 2018, thanks to the standard Euroconnector system (IEC 60974-7 standard). The welding torch described herein can be used, for example, in the following cases:
  in extended periods of time with 100% cycle, in NEMA class I welding machines, since the torch is water-cooled;
  in straight or almost straight (composite) chamfers, which can dispense with machining or greatly reduce this operation, a factor that has a strong impact on the reduction of cost and total manufacturing time, also reducing the consumption of filler metal;
  in additive manufacturing processes;
  the welding process can be semi-automatic or automatic, or even mechanized.

The estimated cost of using the welding torch proposed herein is around 10 times lower than that of certain models on the market. The use of said torch is also capable of reducing the consumption of filler metal, in addition to reducing the machining time, thus reducing the cost and total manufacturing time.

The torch of this invention also has the ability to be used in any welding source.

It is able to increase the deposition rate in kg/h of filler metal, resulting in an increase in the number of welded joints per hour, for example.

It uses the principle of the pneumatic turbine, creating an orbit defined by an eccentric rotation mechanism, consisting of a diameter adjustment ring and an eccentricity shaft, consequently rotating the consumable wire.

It also has a cooling system for the entire welding torch, in which the gas used in the welding process, or even compressed air, enters through a conductor in the axial direction to the consumable, thus moving a turbine, which in turn moves a tip and a tip holder.

The rotating arc welding torch proposed herein has a turbine that causes an orbit in the consumable wire (filler metal). A diffuser element fits into a neck-like component, a tip fits into the diffuser, and a nozzle functions as a gas flow containment element.

Figure 1:
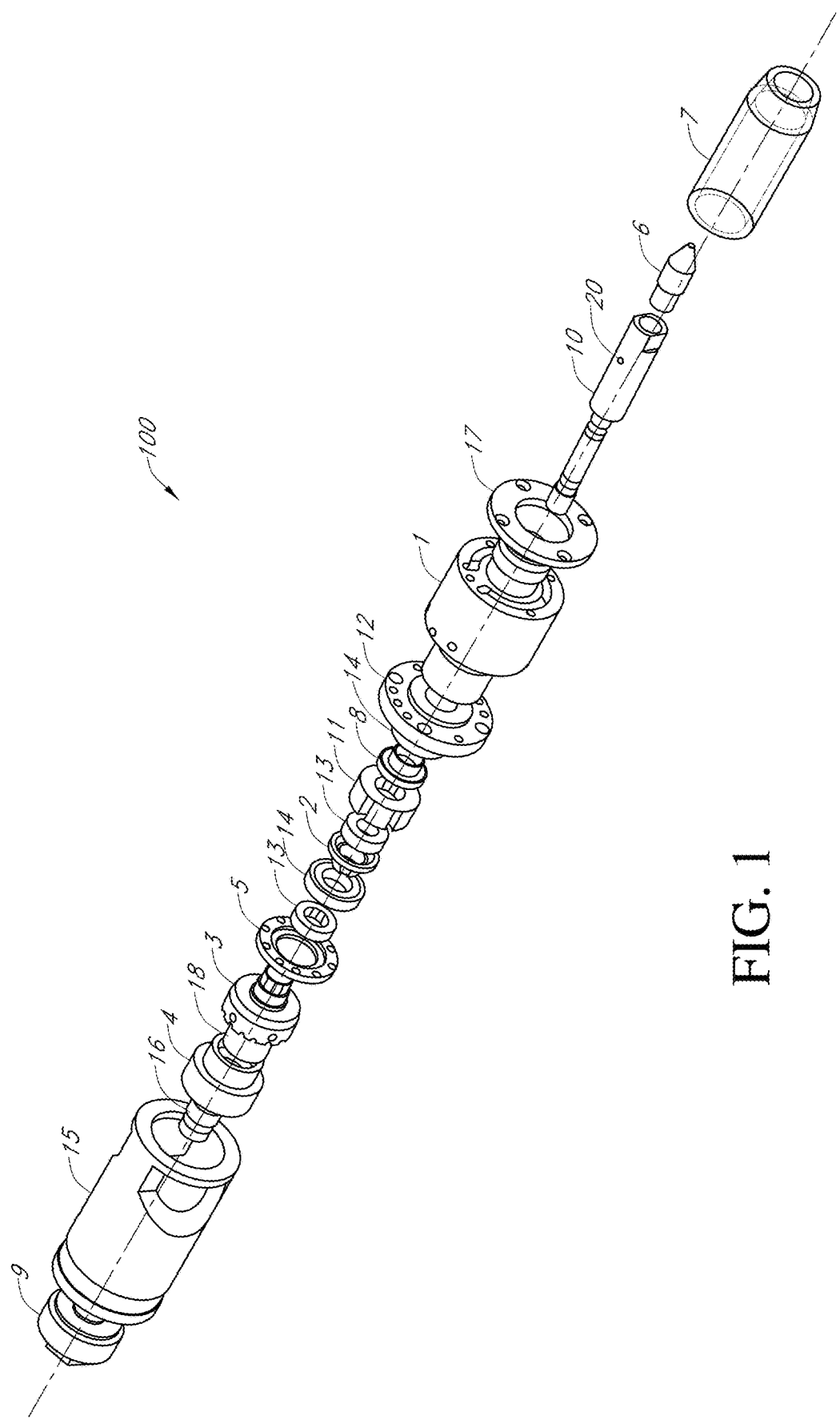
FIG. 1 illustrating the welding torch in exploded view.
Figure 2:
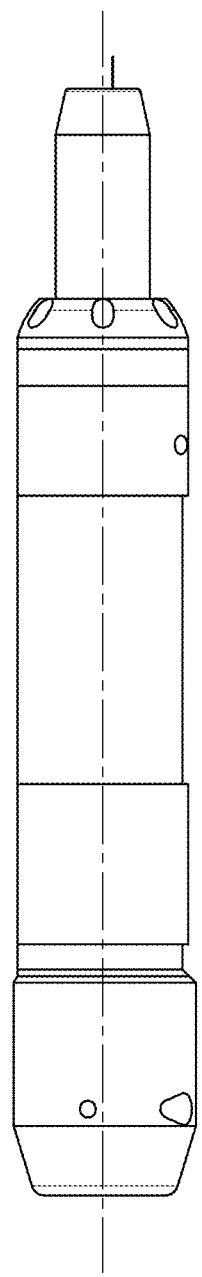
FIG. 2 illustrating a side view of the welding torch.
Figure 3:
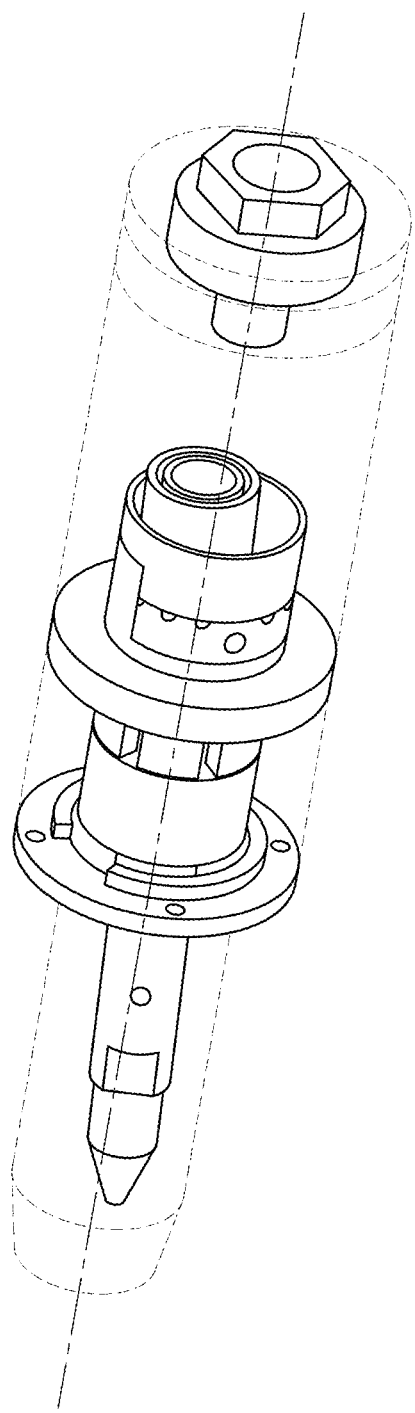
FIG. 3 illustrating a view of the welding torch.

As illustrated in FIG. 1, the welding torch (100) thus comprises a cooling body (1)—its function is to control the torch heating at high amperage, a ball bearing seat coupling sleeve (2)—it houses the ball bearing that allows the shaft to move from the center, a diameter adjustment ring (3)—it allows the central shaft to be moved to adjust the turning diameter of the wire, an eccentricity sleeve (4)—it has as a function balancing the system and incldues side holes (20), a spacer ring (5)—it has the function of insulating and finishing between items 2 and 3, a contact tip (6)—a commercial item that varies according to the wire diameter and has the function of conducting the current to the wire-shaped consumable, which can be solid or tubular, a nozzle (7)—a commercial item that protects the gas outlet up to the contact tip, a ball bearing cap (8)—a protection for the ball bearing, a current input connection (9)—a base with thread for coupling the electric current cable used in the welding process, an eccentricity shaft (10)—a central shaft with the function of shifting the center and driving the consumable wire and gas for welding, a pneumatic turbine rotor (11)—a rotor with blades for rotating the torch, a current insulation sleeve (12)—a polymer sleeve with the function of insulating the welding current, two deep groove ball bearings (13)—a commercial ball bearing-type component, two ball bearings (14)—a commercial ball bearing-type component, an external protective body (15)—an external finish of the torch, a current passage terminal (16)—a connection for pressing the welding current cable, a cooling cover (17)—a cover for the water passage conductors, and a pressing sleeve (18)—a sleeve for pressing the current cable.

The invention claimed is:

1. A welding torch, comprising:
   a cooling cover;
   an outer protection body;
   a cooling body positioned between the cooling cover and the outer protection body;
   an eccentricity shaft housed at least partially within the cooling body;
   a contact tip housed at least partially within the cooling body;
   a nozzle positioned around the contact tip;
   a current insulation sleeve positioned adjacent to the cooling body;
   a current passing terminal housed at least partially within the outer protection body;
   one or more ball bearings;
   one or more deep groove ball bearings positioned adjacent to the one or more ball bearings;
   a ball bearing cap configured to protect one of the one or more ball bearings;
   a ball bearing seat coupling sleeve configured to house one of the one or more ball bearings;
   a pneumatic turbine rotor positioned between at least one of the one or more ball bearings and at least one of the one or more deep groove ball bearings;
   a spacer ring;
   a diameter adjustment ring positioned adjacent to the spacer ring;
   an eccentricity sleeve;
   a pressing sleeve positioned between the diameter adjustment ring and the eccentricity sleeve;
   a current input connection positioned adjacent to the outer protection body; and
   a current passing terminal positioned within the outer protection body.

2. The welding torch according to claim 1, wherein the eccentricity shaft comprises a diffuser and the contact tip fits into the diffuser, and wherein the cooling cover is configured to contain gas flow.

3. The welding torch according to claim 1, wherein the diameter adjustment ring and the eccentricity shaft are configured to mechanically adjust and define an orbit of the contact tip when a pneumatic turbine rotates the pneumatic turbine rotor.

4. The welding torch according to claim 3, further comprising a consumable wire, wherein the consumable wire rotates.

5. The welding torch according to claim 1, wherein the cooling body is configured to pass a gas used in a welding process in an axial direction to a consumable wire, wherein the pneumatic turbine rotor is configured to be powered by the gas, and wherein the pneumatic turbine rotor is configured to rotate the contact tip and the eccentricity shaft.

6. The welding torch according to claim 1, wherein the welding torch is water- cooled.

7. The welding torch according to claim 1, wherein the welding torch further comprises a standard connector system.

* * * * *

UNITED STATES PATENT AND TRADEMARK OFFICE
CERTIFICATE OF CORRECTION

| | |
|---|---|
| PATENT NO. | : 12,325,096 B2 |
| APPLICATION NO. | : 17/757445 |
| DATED | : June 10, 2025 |
| INVENTOR(S) | : Daniel Adolpho Da Silva Junior |

It is certified that error appears in the above-identified patent and that said Letters Patent is hereby corrected as shown below:

In the Specification

Column 3, Line 11, delete "and incldues side" and insert -- and includes side --.

In the Claims

Column 4, Claim 6, Line 43, delete "is water- cooled." and insert -- is water-cooled. --.

Signed and Sealed this
Fifth Day of August, 2025

Coke Morgan Stewart
*Acting Director of the United States Patent and Trademark Office*